United States Patent

[11] 3,596,052

[72] Inventor Richard F. Smith
R.F.D. #1, Carrollton, Va. 23314
[21] Appl. No. 845,339
[22] Filed July 28, 1969
[45] Patented July 27, 1971

[54] WELDING ROD HOLDER ARRANGEMENT
11 Claims, 8 Drawing Figs.
[52] U.S. Cl. ..................................... 219/138,
219/144
[51] Int. Cl. ..................................... B23k 9/28
[50] Field of Search ............................ 219/138,
139, 140, 141, 142, 143, 144

[56] References Cited
UNITED STATES PATENTS
| | | | |
|---|---|---|---|
| Re. 20,808 | 7/1938 | Churchward | 219/141 |
| 1,462,431 | 7/1923 | Wagner | 219/234 |
| 2,364,508 | 12/1944 | Bernard | 219/142 |
| 2,604,568 | 7/1952 | Peyreferry | 219/138 |

Primary Examiner—J. V Truhe
Assistant Examiner—Hugh D. Jaeger
Attorney—Jacobi, Davidson, Lilling & Siegel ABSTRACT: There is disclosed a welding rod holder arrangement including a welding rod receiving member of electrically conductive material and having a welding rod receiving and contacting portion that is externally tapered so as to frictionally receive an electrically conductive loop on the end of a welding electrode or wire. The welding rod receiving member is slotted for air-cooling purposes and a slotted casing means of insulating material surrounds a substantial portion of said welding-rod-receiving member while leaving exposed a sufficient length of said externally tapered offset portion as to provide a large surface area for electrical contact with the electrically conductive loop. There is also disclosed a welding electrode or welding wire having an integrally formed electrically conducting eye or loop at one end thereof that ensures a substantial area of contact with the externally tapered portion of the welding-rod-receiving member.

PATENTED JUL 27 1971   3,596,052
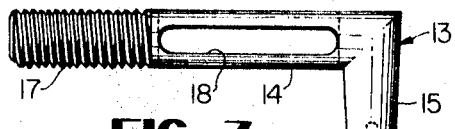
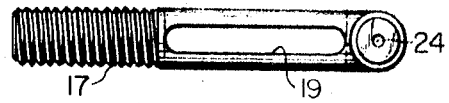
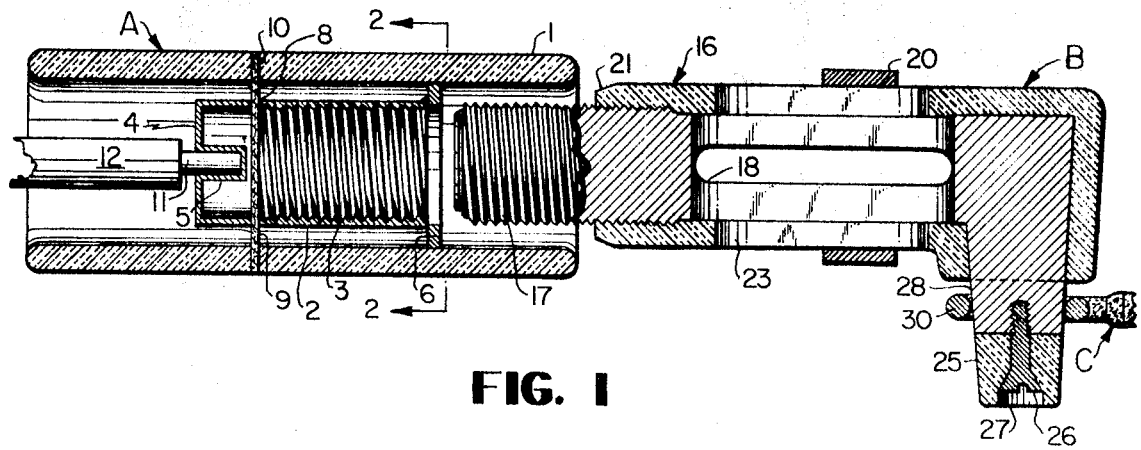
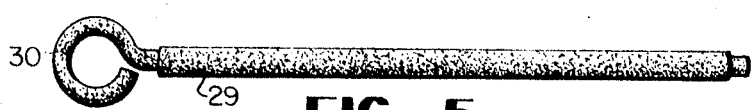
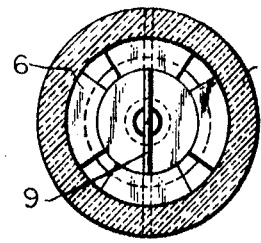
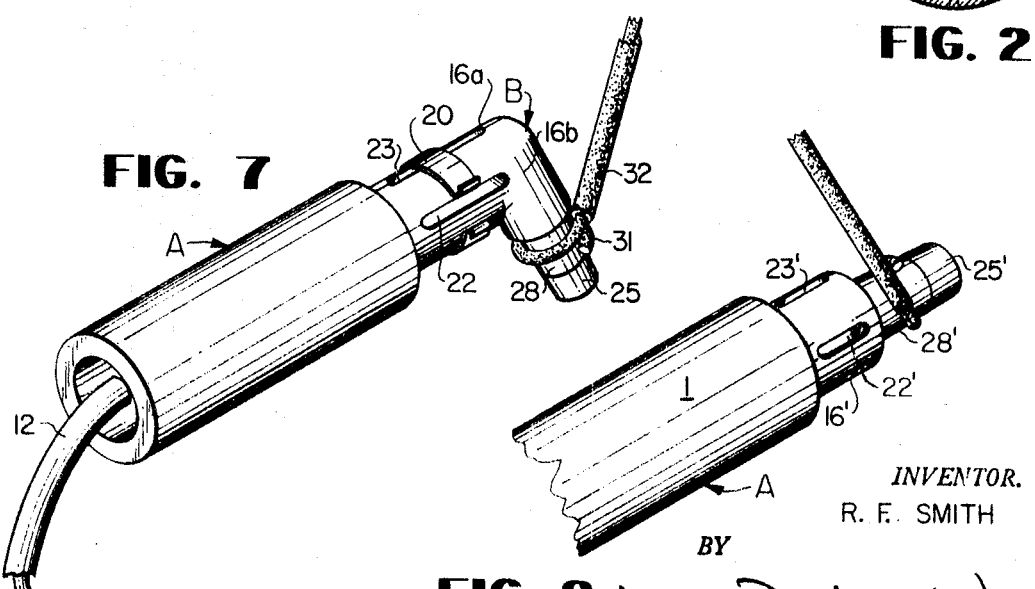
INVENTOR.
R. F. SMITH
BY
Jacobi, Davidson & Newman
ATTORNEYS

WELDING ROD HOLDER ARRANGEMENT

BACKGROUND OF THE INVENTION

The present invention relates broadly to the art of electric welding.

More particularly, this invention relates to a welding rod holder arrangement.

The prior art is replete with welding rod holders that include tongs, gripping jaws, chucks and other attaching means for replaceably receiving welding electrodes or welding wires. In some of these arrangements, the welding electrode is mounted to extend axially of the holder. In others, the jaws or tongs may permit mounting the welding electrode to extend transversely of the axis of the holder but with such arrangements, it is usually necessary to carefully position the welding wire or electrode relative to the teeth of the jaws or tongs. Also in most of such instances, where tongs or clamps are used, the area of contact with the electrode or wire is minimal, usually being spaced tangential contact points between a round wire and straight or serrated jaws or tongs.

Obviously when collet-type chuck arrangements are utilized to grip the electrode or welding wire, the position of such electrode or wire remains constant relative to the holder.

Since modern day industrial developments require electric welding under varying conditions of manipulation by the welder, such as overhead welding, insertion of the tip of the welding electrode into offset or angular positions, through limited access openings and other positions which require the manual manipulation of the welding rod holder, such prior art arrangements do not adequately suffice for all such manipulations.

While a holder with a clamp, jaw- or tong-type attachment to an electrode or welding wire might permit certain manipulation in overhead welding, droppings from the wire can fall into the jaws so as to foul the same, sometimes to the extent as to limit the jaw closing.

Additionally, with spring urged tongs or clamps, the spring means must be compressed many times during a day's work thus in time weakening the gripping force and in some instances reducing the contact efficiency so that the amperage must be periodically adjusted or alternatively heavier lead in cable is required.

Further, when replacing electrodes or welding wires, many prior art devices require careful placement thereof relative to teeth or jaws, whereas other arrangements present only minimal contact between the electrode or welding wire and the current-carrying jaws or wire-contacting portions of the holder.

SUMMARY OF THE INVENTION

Therefore, it is a primary object of this invention to provide a welding rod holder arrangement which obviates the foregoing disadvantages and drawbacks of the prior art.

It is another object of this invention to provide a welding rod holder arrangement which permits what amounts to a universal-joint-type relative positioning or manipulating movement between the handle and electrode or welding wire.

Another important object of this invention is to provide a welding rod holder arrangement which permits maximum electrical contact between the holder contact post and the electrode or welding wire.

Consistent with the immediately aforegoing object, it is a particular object of this invention to provide a cooperative contactive relation between a tapered post portion and a looped end portion of an electrode or welding wire.

It is a further particular object of this invention to provide such looped end portion of the electrode or welding wire in the shape of a coplanar eye, thus minimizing material.

Still another object of this invention is to provide a welding rod holder arrangement which includes means providing an improved air-cooling arrangement, especially in connection with the post member to which the electrode or welding wire is connected.

A specific object of this invention is to provide a welding rod holder arrangement including an electrically conducting post member, including a shank, an externally tapered electrode-receiving portion at one end thereof and a connecting opposite end portion, insulating means of a length to surround a substantial portion of said post member while leaving an electrode-receiving portion exposed, a handle portion including a sleeve means of insulating material, an electrically conducting coupling member within said sleeve means of insulating material, means for electrically connecting a current conductor to such coupling member, means for connecting the end portion of said post member to such coupling member, and an electrode have a looped end frictionally engaged with the tapered electrode receiving portion.

It is a still more specific object of this invention to provide a welding rod holder arrangement as set forth in the immediately preceding object with air-cooling vents in the shank of such post member and surrounding insulating means.

Consistent with the two immediately preceding objects, it is a further specific object to provide such a welding rod holder arrangement in which the electrically conducting coupling member within the sleeve of insulating material of the handle portion is an electrically conducting sleeve member having a socket at one end for receiving a current conductor means and internal threads for receiving cooperating external threads on the connecting portion of the shank of the post member.

BRIEF DESCRIPTION OF THE DRAWINGS

Further and more specific objects and advantages of this invention will be more readily apparent from the following description taken in connection with the accompanying drawings in which:

FIG. 1 is an exploded longitudinal sectional view illustrating one embodiment of a welding rod holder arrangement of this invention;

FIG. 2 is a transverse cross-sectional view taken along line 2–2 of FIG. 1;

FIG. 3 is a side elevational view of the electrode-receiving post member shown in FIG. 1;

FIG. 4 is a bottom plan view of the post member shown in FIG. 3;

FIG. 5 is a top plan view illustrating a welding rod or electrode constructed according to the teach of this invention;

FIG. 6 is a similar view illustrating an electrode having a modified post-engaging loop arrangement;

FIG. 7 is a perspective view, partially broken away illustrating one relative positional relationship of the electrode and welding rod holder arrangement of this invention; and FIG. 8 is a fragmentary perspective view illustrating a modified electrode-receiving post member arrangement.

DETAILED DESCRIPTION OF THE PREFERRED EMBODIMENTS

The welding rod holder arrangement of this invention, as shown in FIG. 1, includes a handle portion A, a welding electrode or welding-wire-receiving portion B and a welding electrode or wire C.

The handle portion includes an outer sleeve 1 of insulating material, an inner coupling member 2 that is cup-shaped and includes a sleeve portion provided with internal threads 3, a base 4 from which extends an internal socket 5 and arcuate segments 6 soldered or welded to the periphery of one end of the sleeve portion. The sleeve portion has transversely aligned holes 8 therein which receive a transversely extending combined insulating and fixing fiber pin 9 that passes through aligned holes 10 in sleeve 1 and positions the coupling member within the sleeve 1 of the handle portion a distance internally thereof to receive the post member of electrode-receiving portion B. In this connection, the diameter of the circle describing the outer periphery of the arcuate segments 6 is so related to the internal diameter of the sleeve 1 as to permit close fit insertion of coupling member 2 within sleeve 1. The internal socket 5 receives, via a soldered connection, the bared end 11 of a conducting cable 12 that supplies the welding current.

The welding electrode or welding-wire-receiving portion B includes a main electrically conductive member 13 including a shank portion 14, an offset and externally, longitudinally tapered electrode-receiving portion 15 and an insulating covering or casing means 16. The offset portion 15 preferably extends at a right angle to the longitudinal axis of the shank portion 14. The free end of the shank portion is externally threaded at 17 for threaded engagement with the internal threads 3 of the sleeve portion of the coupling member 2. The shank portion 14 is provided with two transversely intersecting longitudinal slots 18 and 19 that extend between the externally threaded portion 17 and the offset electrode receiving portion 15 so as to provide air-cooling vents.

The insulating covering or casing means 16 is a longitudinally split sleeve arrangement including half members 16a and 16b formed to tightly encompass a substantial extent of the shank portion 14 and part of the offset portion 15. A spring metal clip 20 holds the insulating casing means 16 tightly around the main electrically conducting or post member 13. The end of the insulating casing means 16 that is remote from the offset portion 15 of the electrode-receiving member 13 is tapered at 21 so that when the electrode-receiving portion B of the arrangement is axially inserted within the sleeve 1 it will be in a tight engagement therewith but will still permit the relative rotation required to mesh the externally threaded end 17 of the shank portion with the internal threads 3 of the sleeve portion of the inner coupling member 2. Further, it will permit rotational adjustment of the portion B relative to handle A. The insulating covering or casing means 16 is provided with longitudinal slots 22 and 23 which are complementary to the slots 18 and 19 in the shank portion of the post member.

In the illustrated form of the invention, the outer end of the offset portion 15 of the post member is provided with an internally threaded bore 24 and an insulating material cap 25 is secured to the end of offset portion 15 by a screw or bolt 26. In this connection, the screw- or bolt-receiving aperture through the cap 25 is recessed at 27 so that there can be no metal-to-metal contact between the insulating tip and of the offset portion 15 and any metal that the holder arrangement may contact when it is laid down, for instance, on a ship deck.

As clearly shown in FIG. 1, the insulating covering or casing means 16 extends only over a limited extent of the offset and tapered portion 15 so as to leave an exposed electrode or welding wire receiving portion 28 inwardly of the insulating material cap 25.

According to this invention, the welding electrode or wire C includes a consumable welding length 29 and an electrically conductive eye or loop 30. The eye or loop 30 in FIG. 5 is the preferred form and is a coplanar closed loop such as the case with an eye bolt. The internal diameter of the loop 30 is so related to the conicity of the externally tapered portion 15 of the post member that the welding electrode can be frictionally fit on such tapered portion 15 in a manner to ensure a substantially circumferentially complete electrical contacting relationship.

In the FIG. 6 relationship, the loop end 31 of the welding electrode or wire 32 is of an overlapped loop end form which, while still providing substantially complete circumferential contact, utilizes more electrode material than the FIG. 6 arrangement.

FIG. 7 illustrates one of the relative positional relationships between the axis of the handle portion B and the axial extent of the welding electrode or wire C. It is believed to be clear that since the eye or loop portions 30 and 31 can be frictionally fit over the tapered end portion 15 at any desired angular relationship, the welding electrode or wire can extend at any desired angle relative to the longitudinal axis of the handle portion.

Thus, since the offset or angled end portion is at right angles to the axis of the handle portion B, the relative angular positional relationship, occasioned by the loop end of the electrode or wire, provides substantially unlimited manipulative positional arrangement of the tip end of the welding electrode or wire to suit any welding operation. Therefore, the welder can manipulate the electrode to any position he desires, so that during use, he does not have to place his wrist and hand in a tiring position.

FIG. 8 illustrates a modified form of the invention in which the electrode-receiving post member does not include an offset end portion. In this form of the invention, the post member is straight and includes an outer longitudinally tapered portion 28' to the end of which an insulating cap 25' is attached in the same manner as is the case in FIG. 1. The shank of this straight post member is slotted similar to the arrangement shown in FIGS. 3 and 4. The handle portion A is the same structure as in FIG. 1 and the connecting relation between the post member and handle portion is still via a screw threaded engagement between external threads on the end of the post member and the internal threads of the cup-shaped or sleeve-type connecting member within the handle portion A. However, the insulating casing means around the shank portion of the electrode-receiving post member does not have to be a split sleeve. Instead, a sleeve of insulating material 16' having slots 22' and 23' therein, which register with the slots in the shank portion of the electrode-receiving post member receives the post member. The sleeve 16' has such length as to leave the externally threaded end of the post member exposed. With this arrangement, no spring metal clip is required. When the electrode receiving post member and its insulating sleeve 16' are connected to the handle portion, any misalignment of the slots 22' and 23', with respect to the slots in the post member, can be obviated by turning the sleeve 16' relative to the post member and insulating casing 1 of the handle portion.

It is to be pointed out that the two post arrangements of this invention ensure clean contact between the bare portions 28, 28' of the post members and the eyes 30, 31 of the electrodes. Every time the welder places an electrode on the post, he turn the same back and forth several times to ensure the tight fit on the tapered portions and to keep the surface of the post clean. This clean contact relationship reduces the necessity of periodically adjusting the amperage. Also it permits the use of a steel post member because the contact area is larger than when using jaws or clamps, thus providing a longer useful life for the holder arrangement.

However, the invention contemplates forming the post member all of copper, copper and brass, all steel, or a copper alloy shank with a steel offset and tapered electrode-receiving end.

The cap 25 is preferably of a ceramic material and the two-part casing means 16, sleeve 16' and insulating sleeve 1 are made of the conventional insulating materials used in the art, such as hard rubber.

Further, it is clear that the two-part casing means 16 is held on the shank 14 by the spring steel clip 20 and by the adjacent surrounding end of the insulating sleeve 1 on the handle portion when the externally threaded portion 17 of the shank is engaged with the threads 3 of the coupling member 2.

When it is necessary to replace electrodes after one has been used to the extent desireable, the stub of the used electrode can be removed from the tapered conducting portion of the electrode-receiving member in any suitable manner. One aspect of this invention does facilitate easy replacement in that the eye or loop at the end of an unused electrode can be fitted over the stub of a used electrode to pull the same off the tapered electrode-receiving portion. Then the eye or loop of the fresh or unused electrode is frictionally engaged over the tapered conducting portion of the electrode-receiving member.

The fact that the electrically conducting end of the electrode is of loop or eye shape always ensures substantially circumferentially complete contact and turning of the electrode to the extent necessary will always ensure a clean contacting engagement between the tapered portion 28 and the electrode.

Thus with the structural relationship of the present invention, there always results clean electrical contact, better welds, reduced current consumption and no resistance loss.

The slots provide proper cooling because the air venting is in the post member and surrounding sleeve or casing means 16. Further, the coupling member 2 is spaced from the interior of the handle casing 1 so that air can enter into the rear end of the handle portion to provide additional cooling or venting.

It is thus clear that the objects and advantages of this invention set forth at the outset of the specification have been successfully achieved. Accordingly,

What I claim is:

1. A welding tool comprising an electrically conductive welding electrode-receiving member including a shank and an externally tapered welding electrode contacting portion, and a welding electrode having an electrically conductive loop at one end thereof frictionally engaged over said externally tapered welding-electrode-contacting portion.

2. A welding tool as defined in claim 1, wherein said tapered portion is offset with respect to the longitudinal axis of said shank.

3. An arc welding tool having a handle portion and an electrically conductive welding-electrode-receiving member, the improvement in said electrode-receiving member comprising a shank and a bare metal portion extending from said shank, said bare metal portion being externally tapered about the entire periphery thereof for insertion into and frictional engagement with a loop disposed at one end of an electrode.

4. A welding tool as defined in claim 3, wherein said tapered bare metal portion is frustoconical in shape.

5. A welding tool as defined in claim 4, wherein said tapered bare metal portion is offset with respect to the longitudinal axis of said shank.

6. A welding tool as defined in claim 5, wherein said shank has slots therethrough to provide for air circulation.

7. A welding tool as defined in claim 6, further including an insulating casing means surrounding at least the major axial extent of said shank and said insulating casing means having slots therein registering with the slots in said shank.

8. A welding tool as defined in claim 7, wherein said handle portion includes a sleeve of insulating material and at least a portion of said sleeve surrounding at least a portion of said insulating casing means.

9. A welding tool as defined in claim 8, further including means for electrically connecting said shank to a source of welding current, said means comprising an electrically conductive connecting member within said sleeve of insulating material, said connecting member having a socket adapted to be electrically connected to a conductor, said connecting member also including an internally threaded portion and said shank having an externally threaded end portion for threaded engagement within said internally threaded portion.

10. A welding tool as defined in claim 7, wherein said insulating casing means comprises a two-part casing means and metal clip means for holding said two-part casing means in surrounding relation on said shank.

11. A welding tool as defined in claim 4, further including a cap of insulating material connected to the end of said tapered bare metal portion.